US012773585B2

(12) United States Patent
Jang

(10) Patent No.: US 12,773,585 B2
(45) Date of Patent: Oct. 27, 2026

(54) VEHICLE COMPRISING FIRE EXTINGUISHING AGENT INLET STRUCTURE AND VEHICLE CONTROL METHOD

(71) Applicant: SK On Co., Ltd., Seoul (KR)

(72) Inventor: Sun Ho Jang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 170 days.

(21) Appl. No.: 18/818,770

(22) Filed: Aug. 29, 2024

(65) Prior Publication Data

US 2025/0114652 A1 Apr. 10, 2025

(30) Foreign Application Priority Data

Oct. 5, 2023 (KR) ........................ 10-2023-0132800

(51) Int. Cl.
*A62C 3/07* (2006.01)
*A62C 31/28* (2006.01)
*A62C 37/44* (2006.01)

(52) U.S. Cl.
CPC ................ *A62C 3/07* (2013.01); *A62C 31/28* (2013.01); *A62C 37/44* (2013.01)

(58) Field of Classification Search
CPC ............ A62C 3/07; A62C 31/28; A62C 37/44
See application file for complete search history.

(56) References Cited

U.S. PATENT DOCUMENTS

2023/0163409 A1 5/2023 Shin
2023/0181950 A1* 6/2023 Bäder ...................... A62C 3/16 169/47

FOREIGN PATENT DOCUMENTS

CN 110901394 A * 3/2020 .............. B60L 58/24
CN 113521598 A 10/2021
DE 102020131112 A1 5/2022
DE 102021120507 A1 2/2023
DE 102021208376 A1 2/2023
KR 1020230001546 A 1/2023
KR 102516447 B1 4/2023
KR 1020230076161 A 5/2023
WO WO-2015044498 A1 * 4/2015 ............... A62C 3/07

* cited by examiner

*Primary Examiner* — Steven M Sutherland
(74) *Attorney, Agent, or Firm* — The Webb Law Firm

(57) ABSTRACT

Provided is a vehicle including a vehicle body; a battery device mounted on the vehicle body; a fire extinguishing agent inlet structure configured to receive a fire extinguishing agent from an external device; and a flow path disposed on the vehicle body and connected to the fire extinguishing agent inlet structure and the battery device. The fire extinguishing agent inlet structure includes a support unit connected to the vehicle body, and a launch unit configured to be connected to the support unit and the external device, is disclosed.

17 Claims, 11 Drawing Sheets

VEHICLE COMPRISING FIRE EXTINGUISHING AGENT INLET STRUCTURE AND VEHICLE CONTROL METHOD

CROSS-REFERENCE TO RELATED APPLICATION

This application claims priority to Korean Patent Application No. 10-2023-0132800 filed Oct. 5, 2023, the disclosure of which is hereby incorporated by reference in its entirety.

BACKGROUND

Technical Field

Various non-limiting embodiments of the present disclosure relates to a vehicle including a fire extinguishing agent inlet structure, and a vehicle control method.

Technical Description

Unlike a primary battery, a secondary battery can charge and discharge electricity, and thus can be applied to a device within various technical fields such as a digital camera, a mobile phone, a laptop computer, a hybrid vehicle, an electric vehicle, or an energy storage system (ESS). The secondary battery may include a lithium ion battery, a nickel-cadmium battery, a nickel-metal hydride battery, a nickel-hydrogen battery, or the like.

The secondary battery may be manufactured as a flexible pouch-type battery cell, a rigid prismatic-type battery cell, or a rigid cylindrical can-type battery cell. The plurality of battery cells may be formed as a cell assembly.

The cell assembly may be disposed in a case to form a battery module, and a plurality of battery modules may be disposed in a pack frame to form a battery pack. The battery pack may be used in various structures such as vehicles or energy storage systems.

SUMMARY

An electric vehicle or a hybrid vehicle driven by an electric drive source may include a battery device. When a fire occurs in one battery cell of a battery device including a plurality of battery cells, the fire may spread to other adjacent battery cells or other components of a vehicle.

When a fire breaks out in a battery device disposed in a vehicle, it may be difficult to extinguish the fire. For example, if a fire occurs in a battery device disposed in a vehicle, it may be difficult to directly deliver a fire extinguishing agent from the outside of the vehicle to the battery device in which the fire occurred.

According to a non-limiting aspect of the disclosure, a vehicle that may directly provide a fire extinguishing agent delivered from the outside to a battery device may be provided.

According to a non-limiting aspect of the disclosure, a vehicle capable of receiving a fire extinguishing agent in a position spaced apart from the vehicle may be provided.

According to a non-limiting aspect of the disclosure, a vehicle capable of delaying initial spread of a fire may be provided.

A vehicle and a method of controlling the vehicle, according to the disclosure, may be widely applied in the field of green technology such as electric vehicles or the like.

Additionally, a vehicle and a method of controlling the vehicle, according to the disclosure, may be used in eco-friendly electric vehicles, hybrid vehicles, or the like to prevent climate change by suppressing air pollution and greenhouse gas emissions.

In some non-limiting embodiments of the disclosure, a vehicle includes a vehicle body; a battery device mounted on the vehicle body; a fire extinguishing agent inlet structure configured to receive a fire extinguishing agent from an external device; and a flow path disposed on the vehicle body and connected to the fire extinguishing agent inlet structure and the battery device. The fire extinguishing agent inlet structure may comprise a support unit connected to the vehicle body, and a launch unit configured to be connected to the support unit and the external device.

According to a non-limiting embodiment, the fire extinguishing agent inlet structure may include a tube comprising a gas injection region configured to receive a gas, and a fire extinguishing agent injection region in which at least a portion thereof is surrounded by the gas injection region and configured to provide a path for the fire extinguishing agent; and a gas generating device configured to deliver the gas to the gas injection region.

According to a non-limiting embodiment, the launch unit may be connected to the tube and comprises a connector configured to be connected to the external device.

According to a non-limiting embodiment, the fire extinguishing agent inlet structure may comprise a cover configured to cover at least a portion of the launch unit. The cover may be configured to be at least one of ruptured and at least partially separated from the vehicle body, when the launch unit is launched outside of the vehicle.

According to a non-limiting embodiment, the vehicle may further include a sensor module comprising at least one of the following: a temperature sensor configured to sense a temperature of the battery device, a pressure sensor configured to sense a pressure of the battery device, a gas sensing sensor configured to sense a flammable gas in the battery device, a flame sensing sensor, or an input device configured to sense a user input, or any combination thereof.

According to a non-limiting embodiment, the launch unit may be configured to be launched outside of the vehicle body based on the temperature sensed by the sensor module.

According to a non-limiting embodiment, the launch unit may be configured to be launched outside of the vehicle body, based on the user input acquired from the input device.

According to a non-limiting embodiment, the vehicle may further include a processor configured to modify the fire extinguishing agent inlet structure, based on information sensed by the sensor module.

According to a non-limiting embodiment, the processor may be configured to stop the vehicle, based on information sensed by the sensor module.

According to a non-limiting embodiment, the vehicle may further include a fire extinguishing agent tank disposed in the vehicle body. The flow path may comprise a first flow path connecting the fire extinguishing agent tank and the battery device, and a second flow path connecting the fire extinguishing agent tank and the fire extinguishing agent inlet structure.

According to a non-limiting embodiment, the vehicle may further include a backflow prevention structure configured to allow movement of the fire extinguishing agent from the fire extinguishing agent inlet structure to the battery device, and to reduce or block movement of the fire extinguishing agent from the battery device to the fire extinguishing agent inlet structure.

According to a non-limiting embodiment, the launch unit may be configured to expand. A distance between an end portion of the launch unit and the vehicle body may be configured to increase based on expansion of the launch unit.

According to a non-limiting embodiment, the battery device may comprise a plurality of battery cells, a case accommodating the plurality of battery cells, and a fire extinguishing agent inlet formed in the case and connected to the flow path.

According to a non-limiting embodiment, the fire extinguishing agent may be delivered from the external device to the battery device through the fire extinguishing agent inlet structure and the flow path.

According to a non-limiting embodiment, the fire extinguishing agent may comprise at least one of the following: water, an insulated coolant, a foam fire extinguishing agent, a powder fire extinguishing agent, a fire extinguishing gas, or any combination thereof.

In some embodiments of the disclosure, a method for controlling a vehicle includes sensing at least one of information of a battery device or a user input using a sensor module; and modifying a fire extinguishing agent inlet structure, based on the at least one of the information of the battery device or the user input sensed by the sensor module.

According to a non-limiting embodiment, the sensing operation may include a first sensing operation configured to be performed in a running state of the vehicle, and a second sensing operation configured to be performed in a stationary state of the vehicle.

According to a non-limiting embodiment, the method may further include changing a speed of the vehicle, based on the first sensing operation. The operation of modifying a fire extinguishing agent inlet structure may be performed, based on the second sensing operation.

According to a non-limiting embodiment, modifying a fire extinguishing agent inlet structure may include an operation modifying the fire extinguishing agent inlet structure may include an igniting a gas generating device of the fire extinguishing agent inlet structure; and an expanding at least a portion of a tube using a gas generated by the gas generating device.

According to a non-limiting embodiment, the method may further include a reporting operation of transmitting accident information of the vehicle externally, based on the sensing operation.

BRIEF DESCRIPTION OF THE DRAWINGS

Certain aspects, features, and advantages of the disclosure are illustrated by the following detailed description with reference to the accompanying drawings.

DETAILED DESCRIPTION

Figure 1:
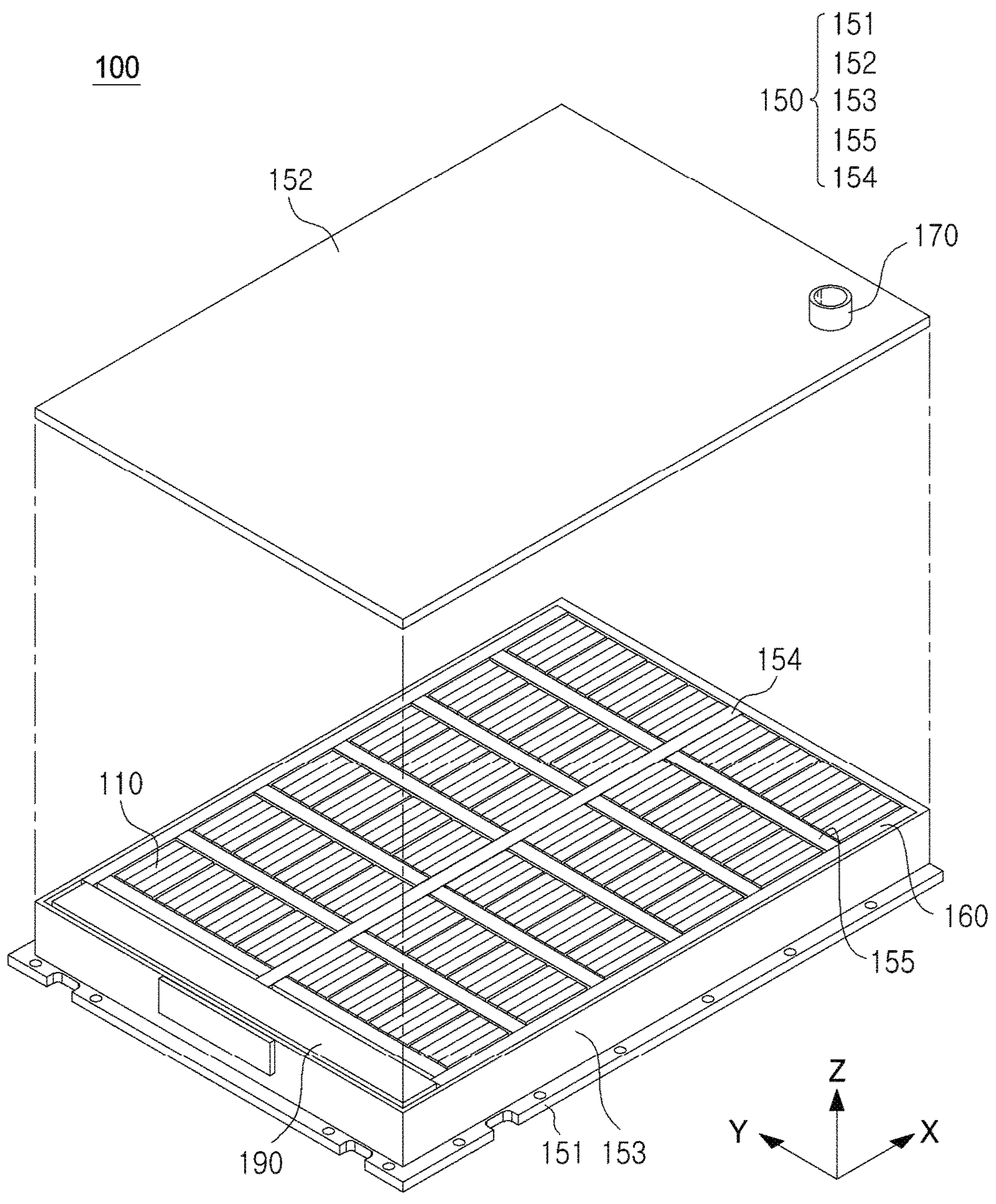
FIG. 1 is an exploded perspective view of a battery device, according to a non-limiting embodiment of the present disclosure.

Hereinafter, the disclosure will be described in detail with reference to the attached drawings. However, this is merely illustrative and the disclosure is not limited to the specific embodiments described by way of example.

Terms or words used in the specification and claims described below may not be construed as limited to their ordinary or dictionary meanings. The inventor will interpret the meaning and concept consistent with the technical idea of the disclosure based on the principle that the concept of the term may be appropriately defined in order to explain the disclosure in the best manner.

Therefore, embodiments described in this specification and configurations illustrated in the drawings are non-limiting embodiments of the disclosure, and may not represent the entire technical idea of the disclosure, and various equivalents may be substituted for them at the time of filing the present application. It will be appreciated that there may be variations.

Detailed descriptions of well-known functions and configurations that may obscure the gist of the disclosure may be omitted. In the attached drawings, some components may be exaggerated, omitted, or schematically illustrated, and a size of each component does not entirely reflect an actual size.

FIG. 1 is an exploded perspective view of a battery device, according to a non-limiting embodiment.

Referring to FIG. 1, a battery device 100 may include at least one cell assembly 110 and a case 150.

A cell assembly 110 may include a plurality of battery cells 111 stacked. A battery cell 111 may be a secondary battery. For example, the battery cell 111 may be a lithium ion battery, but is not limited thereto. For example, the battery cell 111 may be a nickel-cadmium battery, a nickel-metal hydride battery, or a nickel-hydrogen battery that may be charged and discharged. The battery cell 111 may include an electrode assembly including a positive electrode, a negative electrode, and a separator.

The case 150 may accommodate the at least one cell assembly 110. For example, the case 150 may include a bottom member 151 supporting a bottom surface of the cell assembly 110, a cover member 152 covering a top surface of the cell assembly 110, and a side wall member 153 connecting the bottom member 151 and the cover member 152.

The case 150 may include partition walls 154 and 155 crossing at least a portion of a plurality of cell assemblies 110. For example, an internal space of the case 150 may be divided into a plurality of spaces by partition walls 154 and 155. The partition walls 154 and 155 may be installed across the internal space of the case 150 to reinforce rigidity of the case 150. In a non-limiting embodiment, the partition walls 154 and 155 may include a first partition wall 154 and a second partition wall 155, arranged perpendicularly to each other. In a non-limiting embodiment, at least a portion of the partition walls 154 and 155 may include a venting hole H for guiding a path of gas and/or flames generated in the battery cell 111.

In a non-limiting embodiment, a battery device 100 may include a duct member 160. A flow space in which gas and/or flames discharged from the cell assembly 110 flows may be formed in the duct member 160. The duct member 160 may be disposed in the case 150. The flow space of the duct member 160 may be connected to the venting hole H of the second partition wall 155. For example, gas and/or flames generated from the battery cell 111 of the cell assembly 110 may pass through the venting hole H of the second partition 155 and the flow space of the duct member 160, to deliver the same outside of the battery device 100.

In a non-limiting embodiment, the battery device 100 may include a fire extinguishing agent inlet 170 for receiving a fire extinguishing agent from the outside of the battery device 100. The fire extinguishing agent inlet 170 may be formed on the surface of the case 150. In a non-limiting embodiment, the fire extinguishing agent inlet 170 may be formed in the cover member 152 of the case 150. According to another embodiment (not illustrated), the fire extinguishing agent inlet 170 may be formed in the side wall member 153 of the case 150 and/or the bottom member 151 of the case 150.

The battery device 100 may include a battery controller 190 for controlling the battery cell 111. The battery controller 190 may be disposed in the case 150. The battery controller 190 may include a battery management system (BMS). Since a configuration of the battery controller 190 is known in various forms, a detailed description thereof will be omitted.

A structure of the battery device 100 in FIG. 1 is illustrative. For example, in FIG. 1, the battery device 100 is illustrated as a battery pack including prismatic battery cells, but a structure of the battery device 100 is not limited thereto. For example, the battery device 100 may be a battery module including cylinder-type battery cells or pouch-type battery cells, or a battery pack including cylindrical battery cells or pouch-type battery cells.

Figure 2:
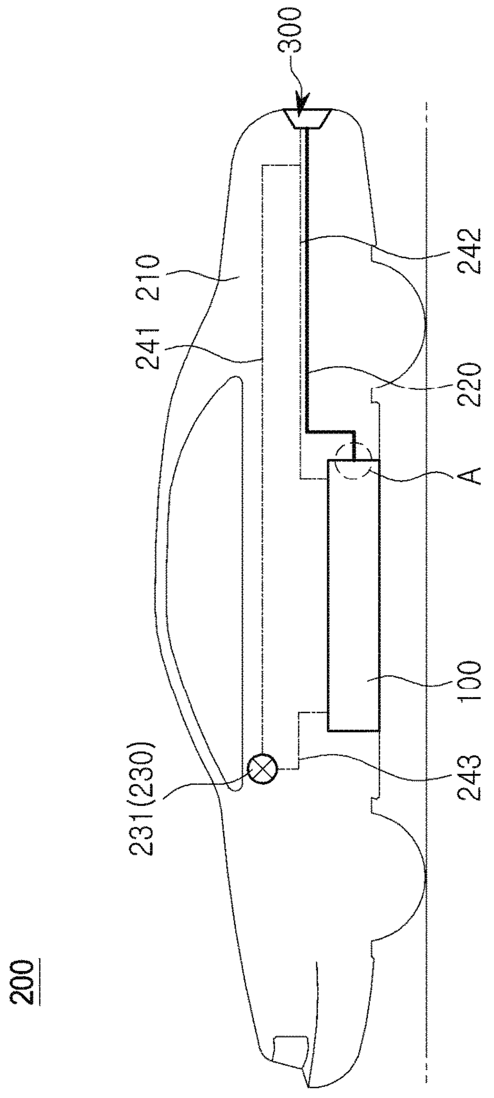
FIG. 2 is a schematic view of a first state of a vehicle including a battery device and a fire extinguishing agent inlet structure according to a non-limiting embodiment of the present disclosure.
Figure 3:
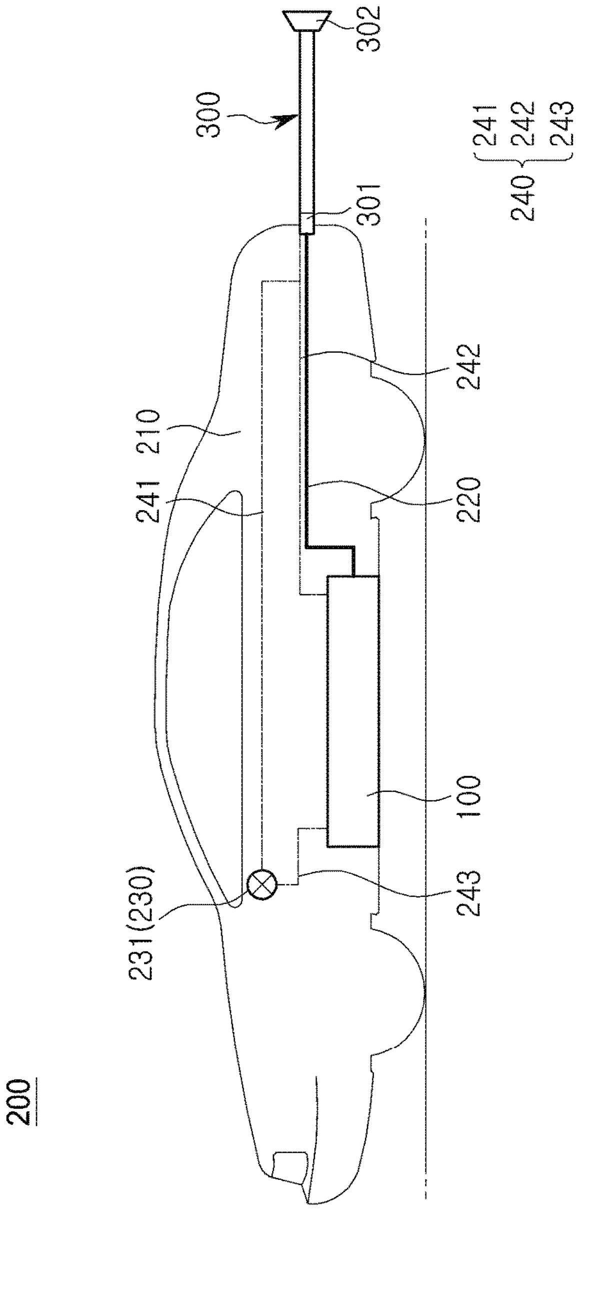
FIG. 3 is a schematic view of a second state of a vehicle including a battery device and a fire extinguishing agent inlet structure according to a non-limiting embodiment of the present disclosure.
Figure 4:
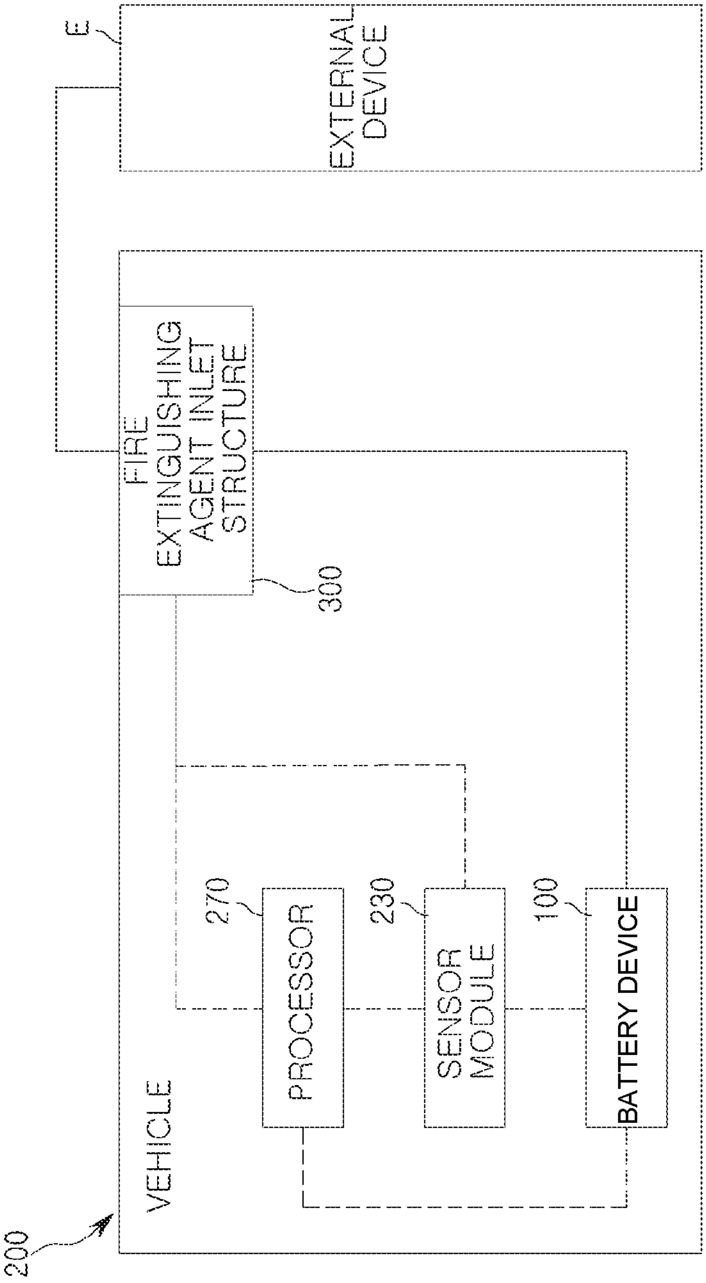
FIG. 4 is a block diagram of a vehicle including a battery device and a fire extinguishing agent inlet structure according to a non-limiting embodiment of the present disclosure.

FIG. 2 is a schematic view of a first state of a vehicle including a battery device and a fire extinguishing agent inlet structure according to a non-limiting embodiment. FIG. 3 is a schematic view of a second state of a vehicle including a battery device and a fire extinguishing agent inlet structure according to a non-limiting embodiment. FIG. 4 is a block diagram of a vehicle including a battery device and a fire extinguishing agent inlet structure according to a non-limiting embodiment.

Referring to FIGS. 2, 3, and/or 4, a vehicle 200 may include a battery device 100, a flow path 220, a sensor module 230, and a fire extinguishing agent inlet structure 300. The description of the battery device 100 in FIG. 1 may be applied, mutatis mutandis, to the battery device 100 in FIGS. 2, 3, and 4.

The vehicle 200 may be driven using the battery device 100. For example, the vehicle 200 may be an electric vehicle or a hybrid vehicle. The vehicle 200 may include a motor (not illustrated), and the motor may operate, based on current generated from the battery device 100. The vehicle 200 may include a vehicle body 210 forming at least a portion of an exterior of the vehicle 200 and accommodating a plurality of components (e.g., battery devices 100). The vehicle body 210 may be referred to as a vehicle body.

The battery device 100 may receive a fire extinguishing agent from the outside of the vehicle 200. For example, the battery device 100 may receive a fire extinguishing agent that has passed through the flow path 220 and the fire extinguishing agent inlet structure 300 from an external device E. The battery device 100 may be accommodated or disposed in the vehicle body 210 of the vehicle 200. A type of fire extinguishing agent may be optional as long as it is a material for extinguishing a fire occurring in the battery device 100. For example, the fire extinguishing agent may include at least one of water, an insulating cooling water, a fire extinguishing foam, a fire extinguishing powder, or a fire extinguishing gas.

The flow path 220 may be disposed in the vehicle body 210 of the vehicle 200. The flow path 220 may connect the fire extinguishing agent inlet structure 300 and the battery device 100. For example, a fire extinguishing agent delivered from the outside of the vehicle 200 (e.g., external device E) may be delivered to the battery device 100 through the fire extinguishing agent inlet structure 300 and the flow path 220. The flow path 220 may be a pipe including an empty space.

The sensor module 230 may sense information of the vehicle 200 or a user input transmitted to the vehicle 200.

According to a non-limiting embodiment, a sensor module 230 may sense information of the battery device 100. For example, the sensor module 230 may be a temperature sensor configured to sense a temperature of the battery device 100. The sensor module 230 including the temperature sensor may be disposed in the battery device 100. As another example, a sensor module 230 may include a gas sensing sensor, a flame sensing sensor, and/or a pressure sensor configured to sense a concentration of a designated gas (e.g., a combustible gas (carbon monoxide and/or hydrogen)).

According to a non-limiting embodiment, a sensor module 230 may be an input device 231 configured to sense the user input. For example, a sensor module 230 may sense the user input (e.g., touch, pressure, and/or proximity) provided to the sensor module 230 by a user. In a non-limiting embodiment, the input device 231 may be referred to as an emergency button.

A processor 270 may modify the fire extinguishing agent inlet structure 300, based on information sensed by the sensor module 230. For example, a processor 270 may operate a gas generating device (e.g., gas generating device 320 of FIGS. 5 and 6). The processor 270 may be electrically connected to the sensor module 230 and the battery device 100.

The processor 270 may be disposed in the vehicle 200. For example, the processor 270 may be mounted on an electronic component configured to control driving of the vehicle 200. As another example, the processor 270 may be a battery controller 190 of FIG. 1.

According to a non-limiting embodiment, a processor 270 may modify the fire extinguishing agent inlet structure 300, based on a temperature sensed by the sensor module 230. For example, when the sensor module 230 senses that the battery device 100 has a specified temperature or higher, the processor 270 may generate a signal for discharging or launching a launch unit 302 of the fire extinguishing agent inlet structure 300 to the outside of the vehicle body 210.

According to a non-limiting embodiment, a processor 270 may modify the fire extinguishing agent inlet structure 300, based on a user input sensed by the sensor module 230. For example, when the user input is sensed in the sensor module 230, the processor 270 may generate a signal for discharging or launching the launch unit 302 of the fire extinguishing agent inlet structure 300 to the outside of the vehicle body 210.

According to a non-limiting embodiment, a processor 270 may modify the fire extinguishing agent inlet structure 300, based on information of the battery device 100 sensed by the sensor module 230. For example, when gas and/or pressure sensed by the sensor module 230 is greater than or equal to a specified value, the processor 270 may generate a signal for discharging or launching the launch unit 302 of the fire extinguishing agent inlet structure 300 to the outside of the vehicle body 210. As another example, when a flame is sensed in the sensor module 230, the processor 270 may generate a signal for discharging or launching the launch unit 302 of the fire extinguishing agent inlet structure 300 to the outside of the vehicle body 210.

The sensor module 230 may include at least one of the temperature sensor, the input device 231, the gas sensing sensor, the flame sensing sensor, or the pressure sensor. For example, the sensor module 230 may include the temperature sensor and the input device 231. Even though a temperature sensed by the temperature sensor is the specified temperature or less, the processor 270 may modify the fire extinguishing agent inlet structure 300, when a user input is sensed by the input device 231.

The processor 270 may control driving of the vehicle 200, based on information sensed by the sensor module 230. For example, the processor 270 may control driving of the vehicle 200, based on a temperature, a pressure, a gas concentration, a flame, and/or a user input sensed by the sensor module 230.

According to a non-limiting embodiment, a processor 270 may reduce a speed of the vehicle 200 or stop the vehicle 200, based on information sensed by the sensor module 230. As another example, a processor 270 may park the vehicle 200 in a sensed position (e.g., a shoulder of a road), based on information sensed by the sensor module 230. The processor 270 may perform an operation for launching the fire extinguishing agent inlet structure 300 to the outside of the vehicle 200. The operation for launching the fire extinguishing agent inlet structure 300 may be performed after the vehicle 200 has stopped.

According to a non-limiting embodiment, based on information sensed by the sensor module 230, a processor 270 may perform at least one of an operation for opening a door of the vehicle 200, an operation for opening a cargo compartment accommodating an emergency escape device (e.g., a hammer), or an operation for turning on an emergency light of the vehicle 200.

According to a non-limiting embodiment, a processor 270 may transmit accident information of the vehicle 200 to the outside, based on information sensed by the sensor module 230. For example, a processor 270 may transmit accident information of the vehicle 200 to a pre-designated position (e.g., fire station), when a temperature, a pressure, or a concentration of a specified type of gas in the battery device 100 is a specified value or more, when a flame is sensed, and/or when a user input is sensed in the input device 231. The accident information may transmit a position of the vehicle 200, a type of vehicle 200, and/or a current state (e.g., temperature) of the vehicle 200. The accident information is illustrative, and information included in the accident information is not limited thereto.

The fire extinguishing agent inlet structure 300 may receive a fire extinguishing agent from the outside of the vehicle 200. For example, an insertion portion (e.g., hose) of the external device E receiving a fire extinguishing agent may be connected to the fire extinguishing agent inlet structure 300. The external device E may be connected to the fire extinguishing agent inlet structure 300, to directly deliver the fire extinguishing agent into the battery device 100. As the vehicle 200 receives the fire extinguishing agent through the fire extinguishing agent inlet structure 300, heat transfer and thermal runaway of the battery device 100 may be reduced. The vehicle 200 may receive the fire extinguishing agent from the external device E using the fire extinguishing agent inlet structure 300. As the vehicle 200 receives a larger amount of fire extinguishing agent accommodated in the vehicle body 210, heat transfer and thermal runaway of the battery device 100 may be reduced.

At least a portion of the fire extinguishing agent inlet structure 300 may be exposed to the outside of the vehicle body 210 of the vehicle 200. For example, the fire extinguishing agent inlet structure 300 may include a support unit 301 connected to the vehicle body 210, and a launch unit 302 connected to the support unit 301 and configured to be connected to the external device E.

At least a portion of the fire extinguishing agent inlet structure 300 (e.g., launch unit 302) may be launched or discharged to the outside of the vehicle body 210. For example, the launch unit 302 may be launched to the outside of the vehicle body 210, based on a user input or a temperature sensed by the sensor module 230.

According to a non-limiting embodiment, at least a portion of the fire extinguishing agent inlet structure 300 may be located in the vehicle body 210 in a first state. The first state may be a state in which a user input or a designated temperature is not sensed by the sensor module 230. The first state may be a state in which a fire does not occur in the battery device 100 and/or the vehicle 200 (e.g., a normal state).

According to a non-limiting embodiment (e.g., FIG. 3), the launch unit 302 of the fire extinguishing agent inlet structure 300 may be launched or discharged to the outside of the vehicle body 210 in a second state. The second state may be a state in which a user input or a designated temperature is sensed by the sensor module 230. For example, the second state may be a state in which a fire occurs in the battery device 100 and/or the vehicle 200, or a state in which user input is obtained (e.g., a fire state) in a designated input device 231 (e.g., sensor module 230) configured to recognize an emergency state by the user. The launch unit 302 may be physically connected to the external device E.

A length of at least a portion of the fire extinguishing agent inlet structure 300 may be changed. For example, at least a portion of the fire extinguishing agent inlet structure 300 (e.g., firing portion 302) may be compressed or expanded. At least a portion of the launch unit 302 may be formed in a shape of which a length is changed. A length of the fire extinguishing agent inlet structure 300 in the first state (e.g., FIG. 2) may be longer than a length of the fire extinguishing agent inlet structure 300 in the second state (e.g., FIG. 3). A distance between an end portion of the launch unit 302 and the vehicle body 210 may increase, based on expansion of the launch unit. As a distance between the launch unit 302 and the vehicle body 210 increases, convenience and stability of introducing the fire extinguishing agent may increase.

A structure of the fire extinguishing agent inlet structure 300 may be further described below.

Figure 5:
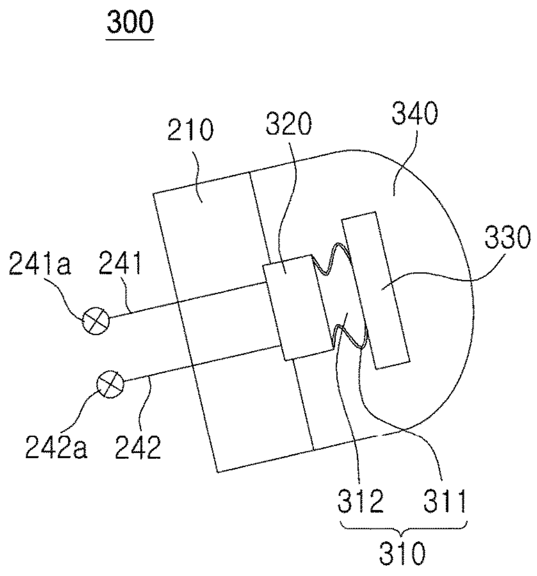
FIG. 5 is a schematic view of a first state of a fire extinguishing agent inlet structure according to a non-limiting embodiment of the present disclosure.
Figure 6:
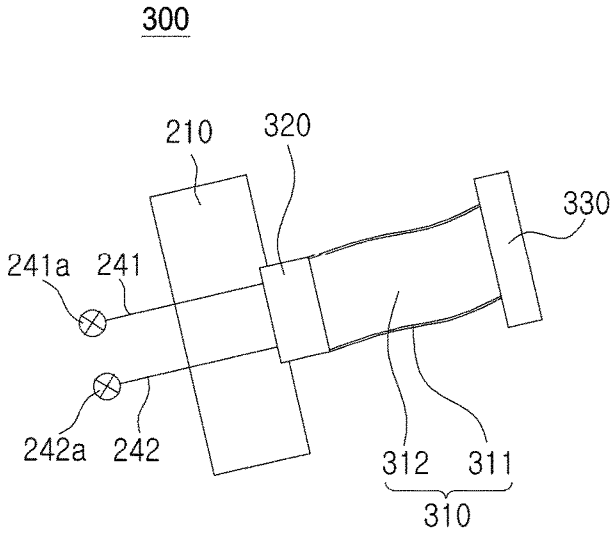
FIG. 6 is a schematic view of a second state of a fire extinguishing agent inlet structure, according to a non-limiting embodiment of the present disclosure.

FIG. 5 is a schematic view of a first state of a fire extinguishing agent inlet structure according to a non-limiting embodiment. FIG. 6 is a schematic view of a second state of a fire extinguishing agent inlet structure, according to a non-limiting embodiment. For example, FIG. 5 is a schematic view of a fire extinguishing agent inlet structure 300 in a first state (e.g., normal state) in which a fire does not occur in a battery device 100 and/or a vehicle 200. FIG. 6 is a schematic view of a fire extinguishing agent inlet structure 300 in a second state (e.g., fire state) in which a fire occurs in a battery device 100 and/or a vehicle 200. For convenience of explanation, it is illustrated that lengths of some components (tube 310) are reduced in FIGS. 5 and/or 6.

Referring to FIGS. 5 and 6, a fire extinguishing agent inlet structure 300 may include a tube 310, a gas generating device 320, and a connector 330. The description of the fire extinguishing agent inlet structure 300 of FIGS. 2, 3, and/or 4 may be applied, mutatis mutandis, to the fire extinguishing agent inlet structure 300 of FIGS. 5 and 6.

The tube 310 may be expanded. The tube 310 may include a gas injection region 311 configured to be expanded by gas. The gas injection region 311 may be expanded by gas (e.g., nitrogen) delivered from the gas generating device 320. The gas injection region 311 may form at least a portion of an edge of the tube 310. The gas injection region 311 may surround at least a portion of a fire extinguishing agent injection region 312. At least a portion of the tube 310 may be disposed in a vehicle 200 in a folded state in a first state (e.g., FIG. 5). At least a portion of the tube 310 may launch or protrude out of the vehicle 200 in a second state (e.g., FIG. 6). The tube 310 may be connected to an external device E using the connector 330. According to a non-limiting embodiment, a length of the tube 310 may be changed. For example, the tube 310 may include a corrugated structure, and a length at which the tube 310 protrudes from a vehicle body 210 of the vehicle 200 may be changed. Due to expansion of the tube 310 or an increase in length of the tube 310, the external device E may supply a fire extinguishing agent to the vehicle 200 and/or the battery device (e.g., battery device 100 in FIG. 1) in a state spaced apart from the vehicle 200. The fire extinguishing agent may be supplied in a position away from the vehicle 200 and/or a battery device 100 in which a fire occurs, to reduce risk of workers (e.g., firefighters) and increase convenience of fire suppression.

The tube 310 may guide the fire extinguishing agent from the external device (e.g., the external device E in FIG. 4) to the vehicle 200. For example, the tube 310 may include a fire extinguishing agent injection region 312 configured to provide a path for the fire extinguishing agent. The fire extinguishing agent injection region 312 may include an empty space for moving the fire extinguishing agent. The fire extinguishing agent injection region 312 may be deformed, based on deformation (e.g., expansion) of the gas injection region 311. For example, the fire extinguishing agent injection region 312 may be connected to the gas injection region 311, and may be expanded together, when the gas injection region 311 is expanded. At least a portion of the fire extinguishing agent injection region 312 may be surrounded by the gas injection region 311.

The gas generating device 320 may expand the tube 310. In a non-limiting embodiment, the gas generating device 320 may include an igniter and sodium azide. The gas generating device 320 may generate gas, based on an operation of a processor (e.g., processor 270 of FIG. 4). For example, a processor 270 may operate the igniter of the gas generating device 320, based on information (e.g., temperature and/or user input) sensed by a sensor module (e.g., sensor module 230 of FIG. 4). By operation of the igniter, sodium azide may be decomposed into nitrogen and sodium. At least a portion of the gas (e.g., nitrogen) generated by the gas generating device 320 may be injected into the gas injection region 311, to expand the gas injection region 311. A structure of the gas generating device 320 is illustrative, and any structure that may expand the gas injection region 311 may be selectively used.

The connector 330 may be connected to an external device (e.g., the external device E in FIG. 4). In a non-limiting embodiment, the connector 330 may be configured to be coupled to a connection portion (e.g., hose) of the external device E. In a non-limiting embodiment, the connector 330 may include a sealing member (e.g., O-ring), not illustrated, to prevent leakage of the fire extinguishing agent. A structure of the connector 330 may be selectively applied as long as it may be connected to and disconnected from a fire hose or a fire hydrant. The connector 330 may be connected to an end portion of the tube 310.

According to a non-limiting embodiment, a fire extinguishing agent inlet structure 300 may include a cover 340 that may cover a portion (e.g., connector 330) of a launch unit (e.g., launch unit 302 in FIG. 3). For example, the cover 340 may prevent the connector 330 from being exposed externally in the first state, and may reduce damage to the connector 330. In the second state, the connector 330 may be exposed to the outside of the vehicle 200. For example, in the second state, at least a portion of the cover 340 may be separated from the vehicle body 210, or may be ruptured. In a non-limiting embodiment, the cover 340 may be separated from the vehicle body 210 of the vehicle 200 by force due to expansion of the tube 310. In a non-limiting embodiment, the cover 340 may be at least partially ruptured by the force due to the expansion of the tube 310. In a non-limiting embodiment, a processor 270 may generate a signal for opening the cover 340, removing the cover 340 from the vehicle body 210, and/or rupturing the cover 340, based on information sensed by a sensor module 230.

The fire extinguishing agent inlet structure 300 may be electrically connected to a battery device (e.g., battery device 100 and/or sensor module 230 of FIG. 2). For example, the gas generating device 320 may be connected to a first signal line 241 connected to an input device 241*a* (e.g., sensor module 230 of FIG. 2), and a second signal line 242 connected to a battery pack 242*a* (e.g., battery pack 100 of FIG. 1), configured to acquire a user input. According to a non-limiting embodiment, a gas generating device 320 may be operated, based on information acquired through the first signal line 241 and/or the second signal line 242. According to another embodiment, a gas generating device 320 may be electrically connected to a processor (e.g., processor 270 of FIG. 4), and may be operated, based on a signal generated from the processor 270.

According to a non-limiting embodiment, a fire extinguishing agent inlet structure 300 may include an elastic member (not illustrated) configured to deform (e.g., expand or stretch) the tube 310.

The elastic member may move based on information sensed by the sensor module 230, and may provide force (e.g., elastic force) to the tube 310. For example, the elastic member (not shown) may include a portion connected to the vehicle body 210 using a fixing member (e.g., latch), and a portion connected to the tube 310.

The processor 270 may generate a signal for moving a latch connected to the elastic member, based on information (e.g., temperature and/or user input) sensed by the sensor module 230. Based on movement of the latch, a compressed elastic member may expand and launch the tube 310 outside of the vehicle (e.g., vehicle 200 in FIG. 3). In the fire extinguishing agent inlet structure 300 including the elastic member, the gas generating device 320 may be omitted. According to another embodiment, a fire extinguishing agent inlet structure 300 may include a gas generating device 320 and an elastic member.

Figure 7:
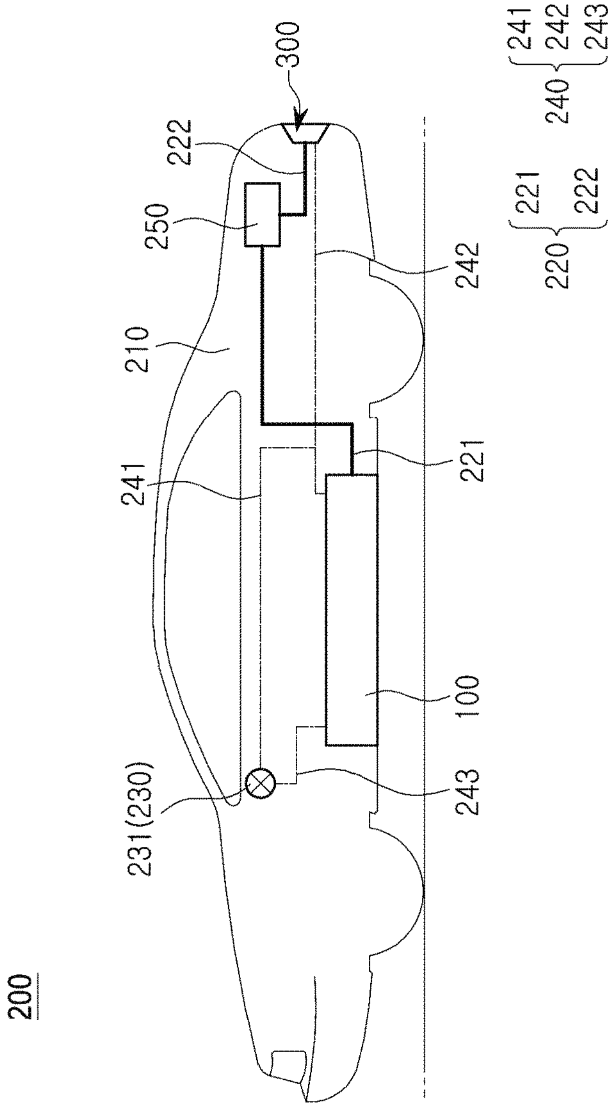
FIG. 7 is a schematic view of a vehicle including a battery device, a fire extinguishing agent inlet structure, and a fire extinguishing agent tank according to a non-limiting embodiment of the present disclosure.

FIG. 7 is a schematic view of a vehicle including a battery device, a fire extinguishing agent inlet structure, and a fire extinguishing agent tank according to a non-limiting embodiment.

Referring to FIG. 7, a vehicle 200 may include a battery device 100, a flow path 220, a sensor module 230, a fire extinguishing agent inlet structure 300, and a fire extinguishing agent tank 250. The descriptions of the vehicle 200, the battery device 100, the flow path 220, the sensor module 230, and the fire extinguishing agent inlet structure 300 in FIGS. 2, 3, and/or 4 may be applied, mutatis mutandis, to the vehicle 200, the battery device 100, the flow path 220, the sensor module 230, and the fire extinguishing agent inlet structure 300 in FIG. 7.

The fire extinguishing agent tank 250 may accommodate at least a portion of a fire extinguishing agent. The fire extinguishing agent may be used to extinguish a fire occurring in the battery device 100. The fire extinguishing agent included in the fire extinguishing agent tank 250 may be used for initial suppression of the fire occurring in the battery device 100.

According to a non-limiting embodiment, a vehicle 200 may include a valve (e.g., backflow prevention structure 260 of FIG. 8) for controlling flow of the fire extinguishing agent in the fire extinguishing agent tank 250. The processor 270 may control opening or closing of the valve, based on information sensed by the sensor module 230.

The flow path 220 may provide a path for the fire extinguishing agent to pass through. For example, the flow path 220 may include a first flow path 221 connecting the fire extinguishing agent tank 250 and the battery device 100, and a second flow path 222 connecting the fire extinguishing agent tank 250 and the fire extinguishing agent inlet structure 300. At least a portion of the fire extinguishing agent received from the fire extinguishing agent inlet structure 300 may be delivered to the battery device 100 through the second flow path 222, the fire extinguishing agent tank 250, and the first flow path 221.

Figure 8:
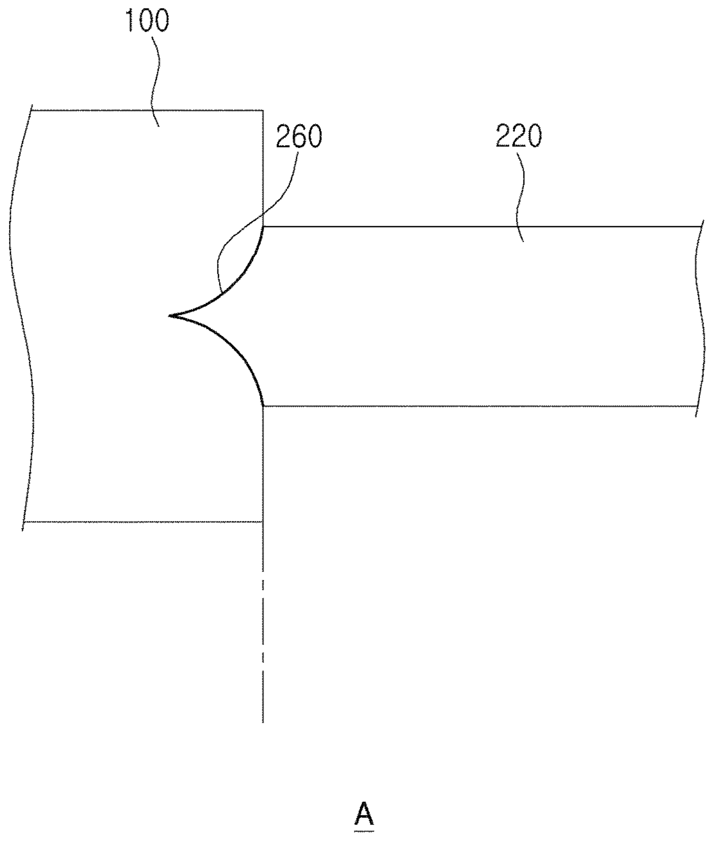
FIG. 8 is an enlarged view of portion A of FIG. 2, according to a non-limiting embodiment of the present disclosure.

FIG. 8 is an enlarged view of portion A of FIG. 2, according to a non-limiting embodiment.

Referring to FIG. 8, a vehicle 200 may include a battery device 100, a flow path 220, and a backflow prevention structure 260. The descriptions of the vehicle 200, the battery device 100, and the flow path 220 of FIGS. 2, 3, and/or 4 may be applied, mutatis mutandis, to the vehicle 200, the battery device 100, and the flow path 220 of FIG. 8.

The backflow prevention structure 260 enables movement of the fire extinguishing agent from a fire extinguishing agent inlet structure (e.g., the fire extinguishing agent inlet structure 300 of FIG. 3) to the battery device 100, and may prevent or reduce the movement of the fire extinguishing agent from the battery device 100 to the fire extinguishing agent inlet structure 300. Due to the backflow prevention structure 260, flow of the fire extinguishing agent may be controlled.

The backflow prevention structure 260 may be selectively designed. For example, the backflow prevention structure 260 may include at least one of a relief valve, a spool valve, or a check valve. As another example, the backflow prevention structure 260 may include a rupture disk.

The backflow prevention structure 260 may be mounted on the battery device 100 and/or the flow path 220. For example, the backflow prevention structure 260 may be connected to an interior of the fire extinguishing agent inlet 170 or the flow path 220 of the battery device 100.

Figure 9A:
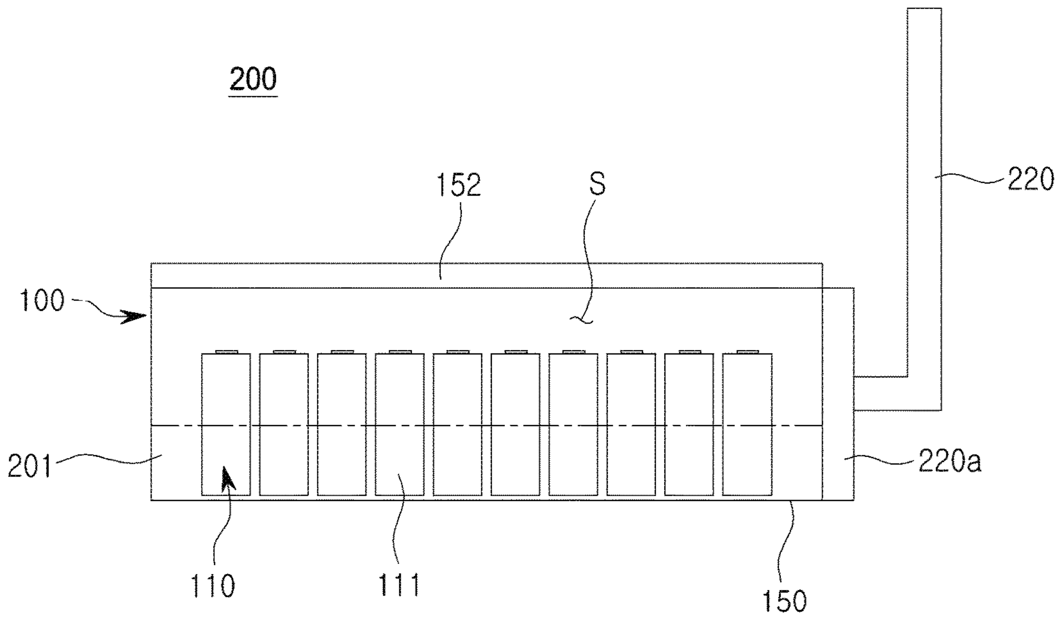
FIGS. 9A and 9B are schematic views of a battery device connected to a fire extinguishing agent inlet structure, according to a non-limiting embodiment of the present disclosure.
Figure 9B:
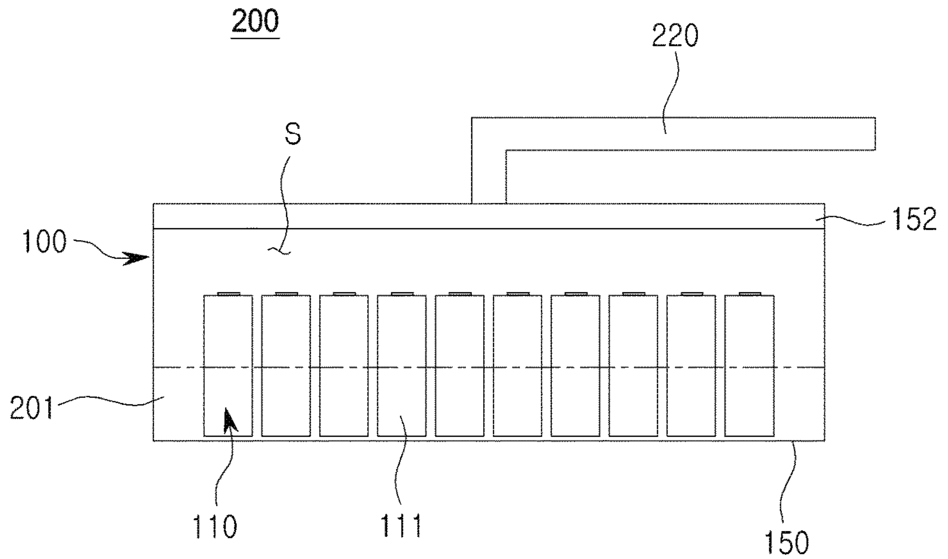

FIGS. 9A and 9B are schematic views of a battery device connected to a fire extinguishing agent inlet structure, according to a non-limiting embodiment.

Referring to FIGS. 9A and 9B, a vehicle 200 may include a battery device 100 and a flow path 220. The battery device 100 may include a cell assembly 110 including a plurality of battery cells 111, and a case 150 accommodating the cell assembly 110. The descriptions of the battery cells 111, the cell assembly 110, the battery device 100, the case 150, the vehicle 200, and the flow path 220 in FIGS. 1 and 2 may be applied, mutatis mutandis, to the battery cells 111, the cell assembly 110, the battery device 100, the case 150, the vehicle 200, and the flow path 220 in FIGS. 9A and 9B.

The case 150 may include an internal space S accommodating the cell assembly 110. The internal space S may be an empty space surrounded by a bottom member (e.g., bottom member 151 in FIG. 1), a cover member 152, and a side wall member (e.g., side wall member 153 in FIG. 1). The internal space S may be in communication with the flow path 220.

The flow path 220 may be connected to the battery device 100. For example, the flow path 220 may be connected to the case 150 of the battery device 100, and may deliver a coolant 201 to the internal space S of the case 150.

A structure or a position in which the flow path 220 is connected to the case 150 may be selectively designed. According to a non-limiting embodiment (e.g., FIG. 9A), the flow path 220 may be connected to the side wall member 153 of the case 150 of the battery device 100. For example, the battery device 100 may include a fire extinguishing agent inlet 220*a* (e.g., fire extinguishing agent inlet 170 of FIG. 1) formed in the side wall member 153. The flow path 220 may be connected to the fire extinguishing agent inlet 220*a* formed in the side wall member 153. According to a non-limiting embodiment (e.g., FIG. 9B), the flow path 220 may be connected to the cover member 152. For example, a fire extinguishing agent inlet (e.g., fire extinguishing agent inlet 170 in FIG. 1) of the battery device 100 may be formed in the cover member 152, and the flow path 220 may be connected to the fire extinguishing agent inlet 170 formed in the cover member 152.

Figure 10:
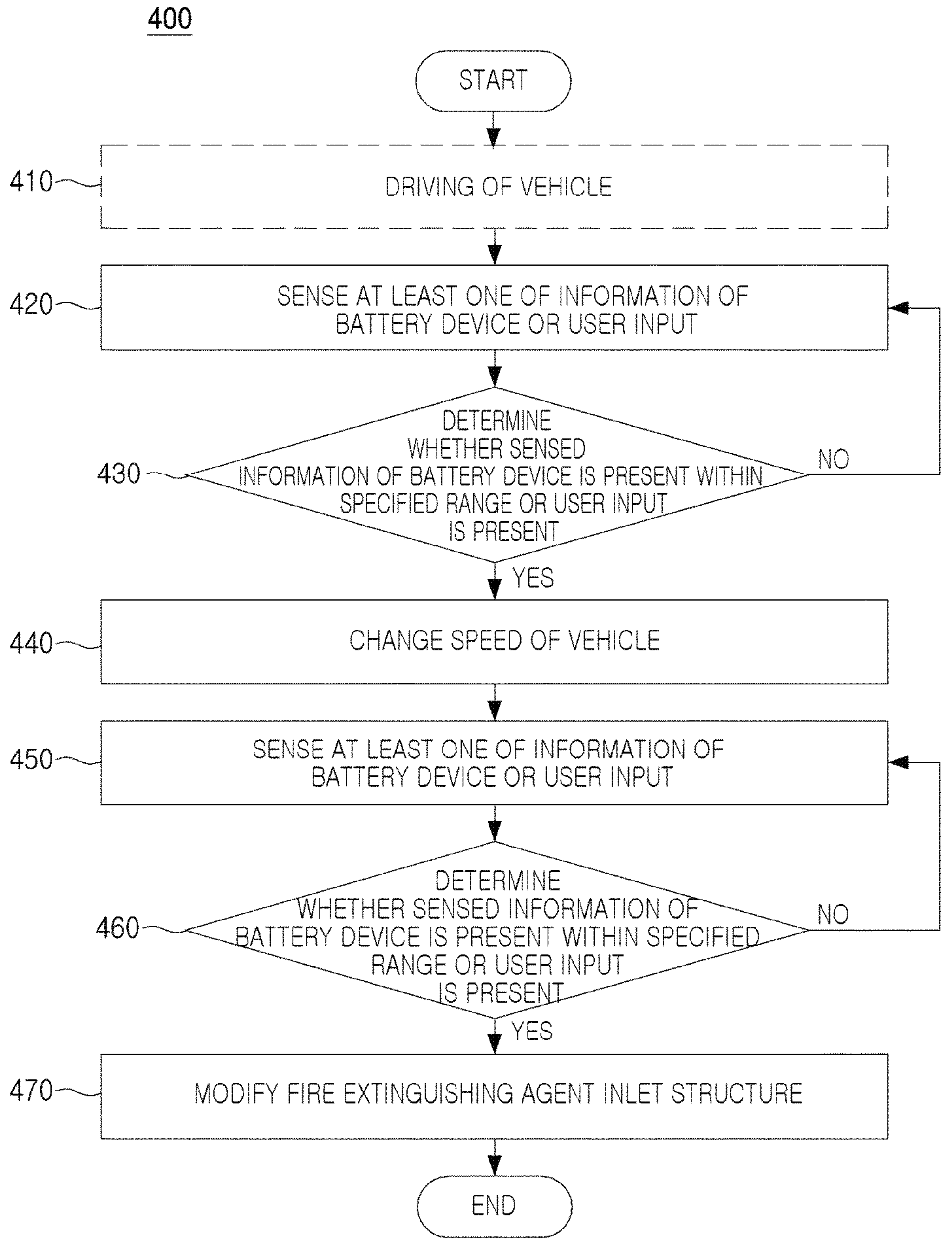
FIG. 10 is a flowchart illustrating a method of controlling a vehicle according to a non-limiting embodiment of the present disclosure.

FIG. 10 is a flowchart illustrating a method of controlling a vehicle according to a non-limiting embodiment.

Referring to FIG. 10, a method 400 of controlling a vehicle may include a first sensing operation 420 of sensing at least one of information of a battery device or a user input, a first determination operation 430 of determining whether the sensed information of the battery device is present within a specified range or the user input is present, a speed change operation 440 of changing a speed of the vehicle, a second sensing operation 450 of sensing at least one of information of the battery device or a user input using a sensor module, a second determination operation 460 of determining whether the sensed information of the battery device is present within a specified range or the user input is present, and/or an operation 470 of modifying a fire extinguishing agent inlet structure.

The method 400 of FIG. 10 may be a method for controlling the vehicle 200 of FIGS. 2, 3, and/or 4. For example, the method 400 may include an operation of modifying the fire extinguishing agent inlet structure 300 of FIGS. 2 to 6, based on information on the battery device 100 and/or a user input, sensed by the sensor module 230 of FIGS. 2, 3, and/or 4.

The first sensing operation 420 may be an operation of sensing at least one of information on the battery device 100 or a user input using a sensor module (e.g., the sensor module 230 of FIG. 4). The sensor module 230 may include at least one of a temperature sensor, a gas sensing sensor, a flame sensing sensor, or a pressure sensor. Information on the battery device 100 may include at least one of a temperature of the battery device 100, a pressure of the battery device 100, a flame located in the battery device 100, or a concentration of a specified gas. The sensor module 230 may include an input device (e.g., input device 231 in FIG. 2). The user input may be touch, pressure, and/or proximity, provided by a user to the input device 231. The first sensing operation 420 may be performed during a vehicle driving operation 410.

The first determination operation 430 determining whether the sensed information of the battery device is present within a specified range or the user input is present may be an operation of determining the information on the battery device 100 and/or the user input, sensed in the first sensing operation 420 by a processor (e.g., processor 270 in FIG. 4). According to a non-limiting embodiment, a processor 270 may determine whether information on the battery device 100 sensed by the sensor module 230 is present within a specified range stored in a memory (not illustrated). For example, the processor 270 may determine whether a temperature of the battery device 100 is within a specified range, and when the sensed temperature of the battery device 100 is within the specified range, the speed change operation 440 may be performed to change the speed of the vehicle. The processor 270 may determine whether a temperature of the battery device 100 is within a specified range, and when the sensed temperature of the battery device 100 does not fall within the specified range, the speed change operation 440 may not be performed. According to a non-limiting embodiment, when the user input is sensed in the sensor module 230, the processor 270 may determine that the user input is present, and may perform the speed change operation 440 of changing a speed of the vehicle.

The speed change operation 440 of changing a speed of the vehicle may be an operation for changing the speed of the vehicle 200, based on information sensed by the sensor module 230. For example, the processor 270 may reduce the speed of the vehicle 200 or stop the vehicle 200, when the information on the sensed battery device 100 is within a specified range or when the user input is present. According to a non-limiting embodiment, a method 400 of controlling a vehicle may perform an operation of parking the vehicle 200 in a position (e.g., shoulder of a road) sensed during the speed change operation 440 of changing a speed of the vehicle.

The second sensing operation 450 may be an operation of sensing at least one of information of the battery device or a user input using a sensor module (e.g., sensor module 230 of FIG. 4). The description of the first sensing operation 420 may be at least partially applied to the second sensing operation 450. A point in time at which the second sensing operation 450 is performed may be different from a point in time at which the first sensing operation 420 is performed. For example, the first sensing operation 420 may be performed while the vehicle 200 is running, and the second sensing operation 450 may be performed while the vehicle 200 is stopped.

The second determination operation 460 of determining whether the sensed information of the battery device is present within a specified range or the user input is present may be an operation of determining the information on the battery device 100 and/or the user input, sensed in the second sensing operation 450 by a processor (e.g., processor 270 in FIG. 4). According to a non-limiting embodiment, a processor 270 may determine whether information on the battery device 100 sensed by the sensor module 230 is present within a specified range stored in a memory (not illustrated). For example, the processor 270 may determine whether a temperature of the battery device 100 is within a specified range, and when the sensed temperature of the battery device 100 is within the specified range, the fire extinguishing agent inlet structure 300 may be modified. The processor 270 may determine whether a temperature of the battery device 100 is within a specified range, and when the sensed temperature of the battery device 100 does not fall within the specified range, the fire extinguishing agent inlet structure 300 may not be modified. According to a non-limiting embodiment, when the user input is sensed in the sensor module 230, the processor 270 may determine that the user input is present, and may modify the fire extinguishing agent inlet structure 300 of the vehicle. A point in time at which the second determination operation 460 is performed may be different from a point in time at which the first determination operation 430 is performed. For example, the first determination operation 430 may be performed while the vehicle 200 is running, and the second determination operation 460 may be performed while the vehicle 200 is stopped.

According to a non-limiting embodiment, in a second determination operation 460, when it is determined whether the sensed information of the battery device 100 sensed by the sensor module 230 is present within a specified range stored in a memory (not illustrated) or the user input is present, the processor 270 may further perform an operation for user's safety. For example, in a second determination operation 460, when it is determined whether the sensed information of the battery device 100 sensed by the sensor module 230 is present within a specified range stored in a memory (not illustrated) or the user input is present, the processor 270 may perform at least one of an operation for opening a door of the vehicle 200, an operation for opening a cargo compartment accommodating an emergency escape device (e.g., a hammer), or an operation for turning on an emergency light of the vehicle 200. As another example, in a second determination operation 460, when it is determined whether the sensed information of the battery device 100 sensed by the sensor module 230 is present within a specified range stored in a memory (not illustrated) or the user input is present, the processor 270 may perform an operation of transmitting accident information of the vehicle 200 to a pre-designated position (e.g., fire station). The accident information may transmit a position of the vehicle 200, a type of vehicle 200, and/or a current state (e.g., temperature) of the vehicle 200.

The operation 470 of modifying a fire extinguishing agent inlet structure may be an operation of launching at least a portion of the fire extinguishing agent inlet structure 300 to the outside of the vehicle 200. For example, when it is determined whether the sensed information of the battery device 100 sensed by the sensor module 230 is present within a specified range stored in a memory (not illustrated) or the user input is present, the processor 270 may ignite the gas generating device 320. When the gas generating device 320 is ignited, gas may flow into the tube 310 and the tube 310 may expand. The operation 470 of modifying a fire extinguishing agent inlet structure may include an operation of igniting a gas generating device (e.g., gas generating device 320 in FIG. 3) and an operation of expanding at least a portion of a tube (e.g., tube 310 of FIG. 3) (e.g., gas injection region 311 of FIG. 3) using a gas generated by the gas generating device 320.

The contents described above are merely an example of applying the principles of the disclosure, and other configurations may be further included without departing from the scope of the disclosure.

Although various non-limiting embodiments of this patent document have been described in detail above, it will be obvious to those of average knowledge in the art that the scope of this patent document is not limited thereto, and various modifications and variations are possible within the scope without departing from the technical spirit of this patent document described in the claims. In addition, it may be implemented by deleting some components from the above-described non-limiting embodiments, and each embodiment may be implemented in combination with each other.

According to a non-limiting embodiment of the disclosure, heat propagation and thermal runaway of a battery device may be prevented or delayed.

According to a non-limiting embodiment of the disclosure, safety of workers may increase during a process of extinguishing a vehicle in which a fire occurs.

According to a non-limiting embodiment of the disclosure, initial spread of a fire may be delayed.

What is claimed is:

1. A vehicle comprising:

a vehicle body;

a battery device mounted on the vehicle body;

a fire extinguishing agent inlet structure configured to receive a fire extinguishing agent from an external device;

a flow path disposed on the vehicle body and connected to the fire extinguishing agent inlet structure and the battery device; and a fire extinguishing agent tank disposed in the vehicle body, wherein the fire extinguishing agent inlet structure comprises a support unit connected to the vehicle body, and a launch unit configured to be connected to the support unit and the external device, and wherein the flow path comprises a first flow path connecting the fire extinguishing agent tank and the battery device, and a second flow path connecting the fire extinguishing agent tank and the fire extinguishing agent inlet structure.

2. The vehicle of claim 1, wherein the fire extinguishing agent inlet structure comprises:

a tube comprising a gas injection region configured to receive a gas, and a fire extinguishing agent injection region in which at least a portion thereof is surrounded by the gas injection region and configured to provide a path for the fire extinguishing agent; and a gas generating device configured to deliver the gas to the gas injection region.

3. The vehicle of claim 2, wherein the launch unit is connected to the tube and comprises a connector configured to be connected to the external device.

4. The vehicle of claim 1, wherein the fire extinguishing agent inlet structure comprises a cover configured to cover at least a portion of the launch unit, wherein the cover is configured to be at least one of ruptured and at least partially separated from the vehicle body when the launch unit is launched outside of the vehicle.

5. The vehicle of claim 1, further comprising a sensor module comprising at least one of the following: a temperature sensor configured to sense a temperature of the battery device; a pressure sensor configured to sense a pressure of the battery device; a gas sensing sensor configured to sense a flammable gas in the battery device; a flame sensing sensor; or an input device configured to sense a user input, or any combination thereof.

6. The vehicle of claim 5, wherein the launch unit is configured to be launched outside of the vehicle body based on the temperature sensed by the sensor module.

7. The vehicle of claim 5, wherein the launch unit is configured to be launched outside of the vehicle body based on the user input acquired from the input device.

8. The vehicle of claim 5, further comprising a processor configured to modify the fire extinguishing agent inlet structure based on information sensed by the sensor module.

9. The vehicle of claim 8, wherein the processor is configured to stop the vehicle based on information sensed by the sensor module.

10. The vehicle of claim 1, further comprising a backflow prevention structure configured to allow movement of the fire extinguishing agent from the fire extinguishing agent inlet structure to the battery device, and to reduce or block movement of the fire extinguishing agent from the battery device to the fire extinguishing agent inlet structure.

11. The vehicle of claim 1, wherein the launch unit is configured to expand, and a distance between an end portion of the launch unit and the vehicle body is configured to increase based on expansion of the launch unit.

12. The vehicle of claim 1, wherein the battery device comprises a plurality of battery cells, a case accommodating the plurality of battery cells, and a fire extinguishing agent inlet formed in the case and connected to the flow path.

13. The vehicle of claim 1, wherein the fire extinguishing agent is delivered from the external device to the battery device through the fire extinguishing agent inlet structure and the flow path.

14. The vehicle of claim 1, wherein the fire extinguishing agent comprises at least one of the following: water, an insulated coolant, a foam fire extinguishing agent, a powder fire extinguishing agent, a fire extinguishing gas, or any combination thereof.

15. A method for controlling a vehicle, comprising:

sensing at least one of information of a battery device and a user input using a sensor module;

modifying a fire extinguishing agent inlet structure, based on the at least one of the information of the battery device and the user input sensed by the sensor module; and changing a speed of the vehicle based on the first sensing operation, wherein the sensing operation comprises a first sensing operation configured to be performed in a running state of the vehicle, and a second sensing operation configured to be performed in a stationary state of the vehicle, and wherein modifying a fire extinguishing agent inlet structure is performed based on the second sensing operation.

16. The method of claim 15, further comprising transmitting accident information of the vehicle externally based on the sensing operation.

17. The method of claim 15, wherein modifying a fire extinguishing agent inlet structure comprises:

igniting a gas generating device of the fire extinguishing agent inlet structure; and expanding at least a portion of a tube using a gas generated by the gas generating device.

* * * * *